United States Patent [19]
Warkentin

[11] Patent Number: 5,988,351
[45] Date of Patent: Nov. 23, 1999

[54] CONVEYOR WITH ROTATING AND OFFLOADING OF CONVEYED UNITS

[76] Inventor: A. James Warkentin, 10300 S. Kings River, #16, Reedley, Calif. 93654

[21] Appl. No.: 08/800,602

[22] Filed: Feb. 19, 1997

[51] Int. Cl.[6] .................................................. B65G 47/10
[52] U.S. Cl. ................................. 198/370.04; 198/370.01; 198/387; 198/779
[58] Field of Search ................... 198/370.01, 370.04, 198/387, 779, 370.02

[56] References Cited

U.S. PATENT DOCUMENTS

| | | | |
|---|---|---|---|
| 3,857,472 | 12/1974 | Klint | 198/20 R |
| 4,033,450 | 7/1977 | Paddock et al. | 198/648 |
| 4,106,628 | 8/1978 | Warkentin et al. | 209/74 M |
| 4,726,898 | 2/1988 | Mills et al. | 209/545 |
| 4,872,564 | 10/1989 | Van Der Schoot | 209/511 |
| 4,961,489 | 10/1990 | Warkentin | 198/365 |
| 4,981,205 | 1/1991 | Cowlin | 198/387 |
| 5,018,864 | 5/1991 | Richert | 356/372 |
| 5,029,692 | 7/1991 | Warkentin | 198/365 |
| 5,106,195 | 4/1992 | Richert | 356/407 |
| 5,156,278 | 10/1992 | Aaron et al. | 209/556 |
| 5,181,596 | 1/1993 | Warkentin | 198/365 |
| 5,195,628 | 3/1993 | Warkentin | 198/370 |
| 5,215,179 | 1/1993 | Warkintin | 198/365 |
| 5,223,917 | 6/1993 | Richert | 356/407 |
| 5,237,407 | 8/1993 | Crezee et al. | 358/107 |
| 5,244,100 | 9/1993 | Regier et al. | 209/556 |
| 5,286,980 | 2/1994 | Richert | 250/560 |
| 5,401,954 | 3/1995 | Richert | 250/226 |
| 5,474,167 | 12/1995 | Warkentin | 198/890.1 |
| 5,497,887 | 3/1996 | Heibert | 209/538 |
| 5,626,236 | 5/1997 | Hiebert | 209/538 |

*Primary Examiner*—Christopher P. Ellis
*Assistant Examiner*—Steven B. McAllister
*Attorney, Agent, or Firm*—Lyon & Lyon

[57] ABSTRACT

A conveyor of product units has mounting brackets extending laterally from endless chains. The mounting brackets rotatably mount two spools having axes parallel to the conveying path. The mounting brackets are displaced longitudinally one from another. Consequently, a central elongate cavity is defined along the conveying path between laterally adjacent spools. Further, lateral concavities are presented between rollers on individual spools and between rollers on separate spools. Pivotally mounted off-loading elements can be articulated to lift product units positioned on the conveying system for off-loading laterally from the conveyor. A laterally articulated actuator is located below the principal conveyor. The actuator includes laterally slidable slats which frictionally engage the overlying rollers associated with each mounting bracket. Guides are then arranged to move the slats laterally with motion of the conveyor. With lateral motion of the slats, the rollers are caused to rotate. Through control of the slats, product units may be rotated by one-half, one-third or even one-quarter of a revolution. Successive movements of the slats will provide further segments to be viewed.

30 Claims, 10 Drawing Sheets

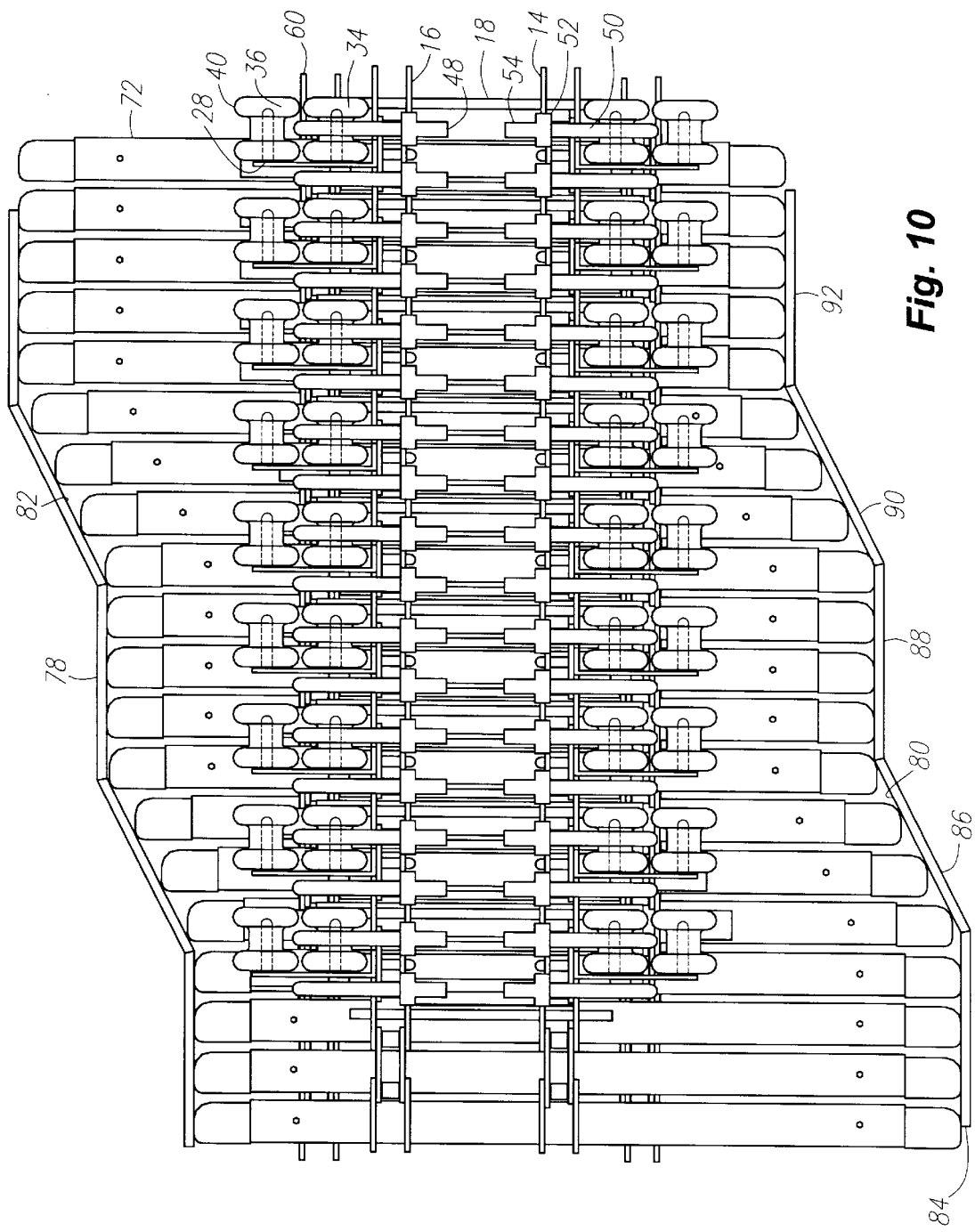

CONVEYOR WITH ROTATING AND OFFLOADING OF CONVEYED UNITS

BACKGROUND OF THE INVENTION

The field of the present invention is conveying systems capable of additionally moving and/or reorienting units being conveyed.

Conveyors for produce have long been available which include rollers. Reference is made to U.S. Pat. No. 4,106,628. Other conveyors for produce have incorporated off-loading elements with a conveyor. Reference is made to U.S. Pat. No. 4,961,489. Conveying systems have also combined use of rollers to define the conveying surface and off-loading elements travelling with the conveying element to off-load produce from the concavities defined between adjacent rollers. Reference is made to U.S. Pat. Nos. 5,029,692, 5,195,628, 5,215,179 and 5,474,167, the disclosures of which are incorporated herein by reference.

In the foregoing patents, the rollers are rotatably mounted to the conveying system about axes perpendicular to the conveying path. Static drives have long been employed beneath such rollers to cause rotation of the product conveyed so that it can be viewed or inspected from multiple sides. Reference is made to U.S. Pat. Nos. 5,156,278, 5,286,980 and 5,401,954, the disclosures of which are incorporated herein by reference. Dynamic drives incorporating friction belts movably mounted and driven beneath the conveyor have been used to speed up or slow down the rotation which might otherwise be provided by a static drive or friction plate located beneath the transversely mounted rollers.

The foregoing patents disclose systems which have provided versatile and efficient conveying with positioning and off-loading which have proven to be accurate and versatile. With long produce, such as cucumbers, squash and the like, the foregoing systems provide an appropriate cradle for conveying the produce but lack the ability to uniformly rotate the produce for inspection of all sides. The presentation of all sides for inspection can be important for blemish grading and recognition of color anomalies.

The foregoing conveying systems have been found to be particularly adaptable for use with electronic scanning equipment. Reference is made to U.S. Pat. Nos. 5,018,864, 5,106,195, 5,156,278, 5,223,917, 5,286,980 and 5,401,954, the disclosures of which are incorporated herein by reference, disclosing such equipment and methods.

SUMMARY OF THE INVENTION

The present invention is directed to a conveying system capable of actively operating on conveyed units.

In a first, separate aspect of the present invention, two sets of rollers are presented on a conveying element. Each set of rollers is rotatably mounted about axes which extend in the elongate direction of the conveying element. The arrangement of these rollers defines a continuous elongate cavity fully along the conveying path. The rollers of each set are spaced one from another to define concavities extending laterally from the continuous elongate cavity. The system is able to receive product units which are spherical or substantially elongate and allow rotation of each.

In a second, separate aspect of the present invention, a conveyor having two sets of rollers with the sets being adjacent to one another and having the rollers rotatably mounted about axes extending in the elongate direction of the conveying element includes off-loading elements pivotally mounted to the conveying element and extending to between the sets of rollers. Product is able to roll about axes parallel to the conveying path and yet is also capable of being off-loaded from the conveyor by elements pivotally mounted to the conveyor. In further details, the rollers may be presented in spools of two rollers each with the off-loading elements extending both between the rollers on each spool and between rollers on adjacent spools. In this way, each concavity defined by the successive rollers may be subject to an off-loading element.

In a third, separate aspect of the present invention, a laterally articulated actuator includes a conveying element which has slats slidably mounted on the conveying element to move laterally. The structure of the conveyor includes a guide surface to move the slats laterally as the conveying element moves forward. This laterally articulated actuator has utility in providing specific lateral movement to elements on an associated conveyor or may independently operate to reposition units conveyed directly thereon.

In a fourth, separate aspect of the present invention, a conveyor having rollers rotatably mounted to an elongate conveying element with axes extending in the elongate direction of the conveying element includes a laterally articulated actuator having its own conveying element and slats mounted to move laterally of the conveying path. The slats are in friction engagement with the rollers. The rollers are driven to rotate through a specific angle corresponding to the lateral movement of the associated slats by selection of an appropriate guide surface extending into the path of travel of the slats. Multiple such movements of the slats may occur to rotate units located on the conveyor sequentially through portions of a full revolution for detailed inspection.

In a fifth, separate aspect of the present invention, the subject matter of any of the foregoing separate aspects may be combined to provide improved conveying systems.

Accordingly, it is an object of the present invention to provide improved conveying systems. Other and further objects and advantages will appear hereinafter.

BRIEF DESCRIPTION OF THE DRAWINGS

FIG. 10 is a plan view of the conveyor of FIGS. 8 and 9 illustrating the actuator with guide surfaces.

DETAILED DESCRIPTION OF THE PREFERRED EMBODIMENTS

Figure 1:
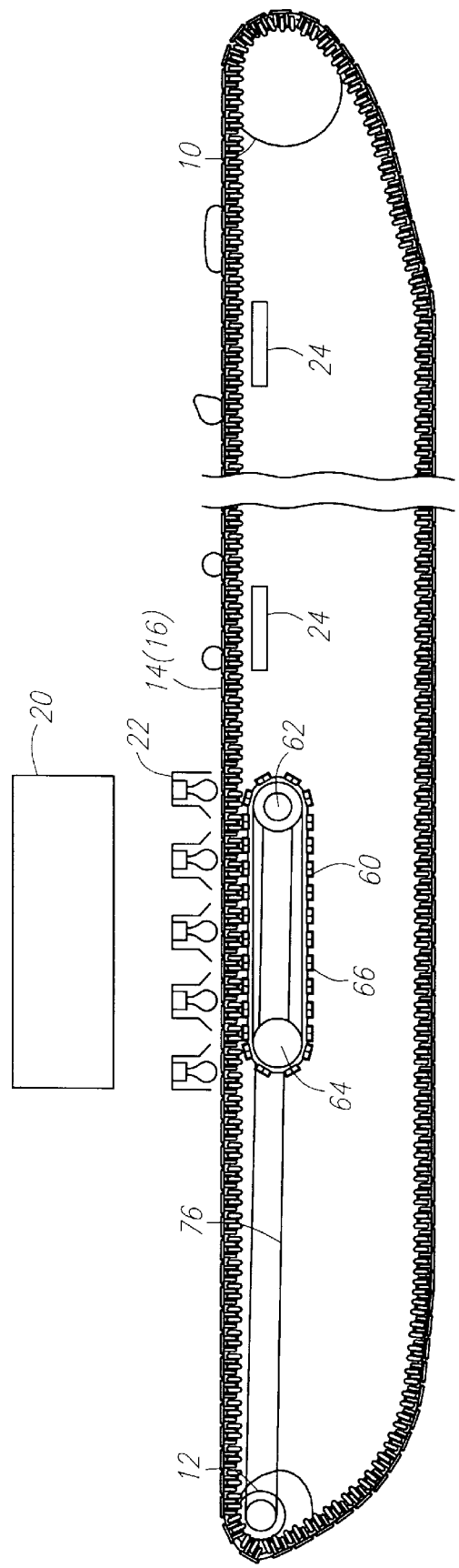
FIG. 1 is a side view of a conveying system.
Figure 2:
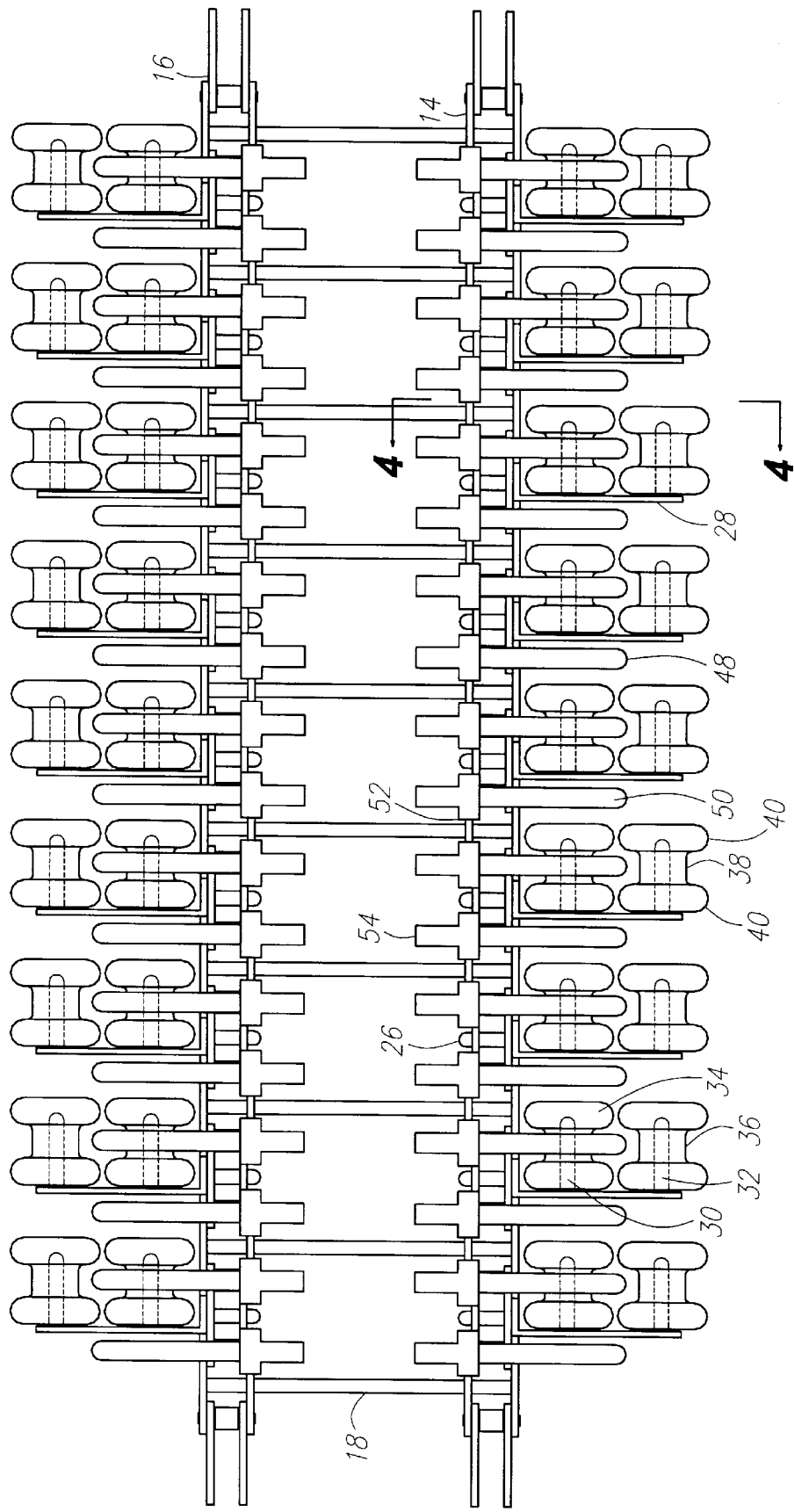
FIG. 2 is a plan view of a portion of the conveying system.
Figure 3:
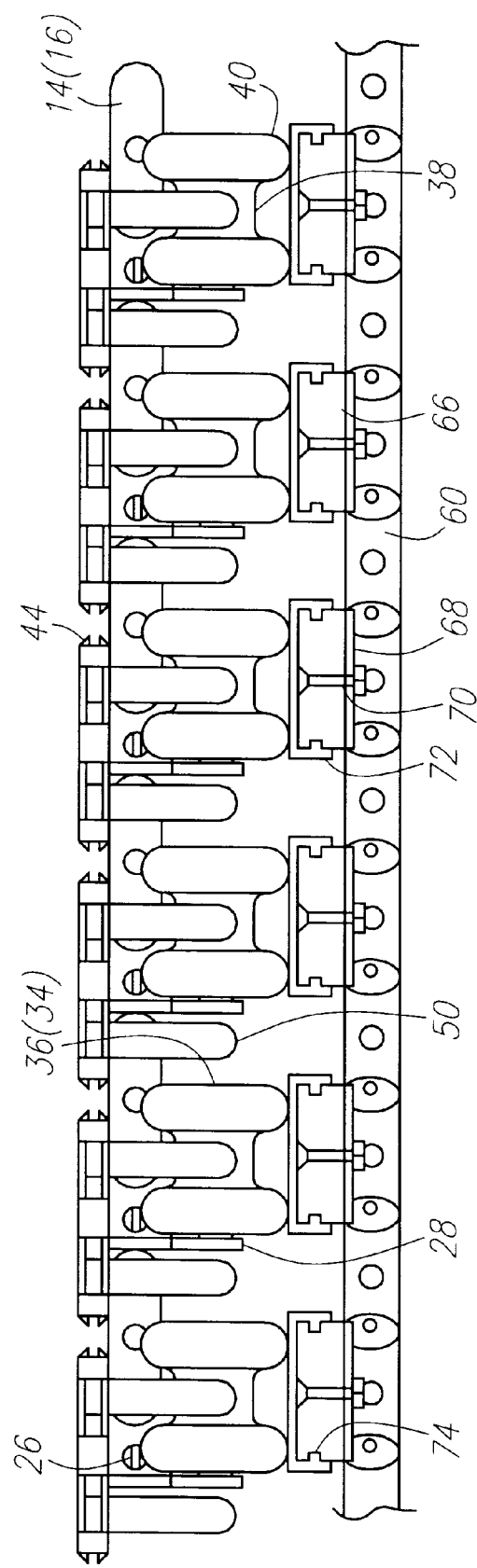
FIG. 3 is a side view of a portion of the conveying system showing greater detail.

Turning in detail to the drawings, conveyors of product units are disclosed, having particular utility for produce. A support structure 8 is provided by a conventional frame such as disclosed in the patents incorporated by reference. Reference is specifically made to U.S. Pat. No. 5,215,179. The support structure provides mounts for chain sprockets, a motor and low friction chain support runners extending along two conveying paths on the deck of the equipment. Drive sprockets 10 are rotatably mounted to the support structure at one end of the conveying paths. Idler sprockets 12 are at the other end of the conveying paths and low friction runners 13 extend between the sprockets 10 and 12 to provide a substantially horizontal path.

Elongate conveying elements 14 and 16 are mounted to the support structure 8 to be driven by the drive sprockets 10, pulled around the idler sprockets 12 and drawn along the low friction runners 13. Successive portions of the conveying elements 14 and 16 continuously establish the conveying paths as the elements are drawn onto the runners. The elongate conveying elements 14 and 16 are defined by endless chains which are conventional roller chains. Rods 18 extend between the endless roller chains 14 and 16 to engage the links of the chains 14 and 16 at the rod ends. These rods 18 keep the chains 14 and 16 from twisting under product load. Spring clips or the like may retain the rods 18 in place.

The chains 14 and 16 continuously pass below optics 20 such as disclosed in the patents incorporated herein by reference. Shielded lamps 22 are arranged adjacent to the conveying path to appropriately illuminate the products conveyed beneath the optics 20. Viewing positions are spaced along the conveying path between the shielded lamps 22. Exits 24 are provided to receive off-loaded product units. A singulator (not shown) distributes product units onto the conveying path.

The conveying equipment presented on each of the chains 14 and 16 is the same. Consequently, only one side of the conveying system need be described.

Holes provided in the roller chain 14 receive barbed split pins 26 of mounting brackets 28. The mounting brackets 28 extend laterally from the chain 14 and include two laterally adjacent spindles 30 and 32. The spindles 30 and 32 extend in the elongate direction of the chain 14 on the same side of each mounting bracket 28. The mounting brackets 28 are mounted to every other link of the chain 14, in this case the narrower links.

Spools 34 and 36 are mounted to each of the spindles 30 and 32, respectively. The spindles 30 and 32 may include split ends with barbs to lock the hubs of the spools 34 and 36 in place. The spools 34 and 36 are mounted on each mounting bracket 28 to define a continuous elongate concavity which extends fully along the conveying path. Each of the spools 34 and 36 includes a small diameter central body 38 and larger diameter rollers 40 at either end. The spools 34 and 36 are also displaced one from another. Consequently, concavities are defined between rollers 40 on the same spool and by the gaps between spools. These concavities extend laterally of the continuous elongate concavity. Thus, elongate products can span between rollers and even across multiple spools in the continuous elongate concavity. Spherical products can also sit stably in the concavities defined by the superposition of the continuous elongate concavity and the lateral concavities between rollers. The same stable placement is provided whether the product unit is sitting on rollers 40 between longitudinally spaced spools 34 and 36 or on rollers 40 associated with the same spools 34 and 36.

The spools 34 and 36 may be split between rollers 40 with a low friction washer or insert between spool portions. In this way the rollers 40 may be rotated independently. Even so, the spool shape may be retained so that the same number of rollers 40 per bracket 28 may be used. Splitting of the spools 34 and 36 has not been found necessary to control sufficiently accurate rotation of the produce to date. It remains as an option.

The rollers 40 of each set are positioned mutually equidistant, both on the same spool and between spools. For most produce, inch and a half centers have been found advantageous. Other center distances are advantageous for particular applications. This is particularly true for smaller units such as berries and nuts. Such accommodations are preferably made on chains with a common roller center to center distance of inch and a half to establish a standardized base. Set up for differences in produce size would then only require changes in the plastic parts carried by the chains.

Pivot axles 44 are shown to be mounted on a base 46 which is fixed against the same link as the mounting brackets 28 by the split barbed pins 26. From the base 46, the two pivot axles 44 extend in the elongate direction of the conveying path in either direction. Received on each of the pivot axles 44 are off-loading elements 48. The off-loading elements 48 include a lifter portion 50 to one side of a journal 52 and an actuator portion 54 extending from the other side of the journal 52. The lifter portion 50 extends to the superposition of the continuous elongate concavity with the lateral concavities between longitudinally adjacent rollers. Because there are two off-loading elements 48 for each of the mounting brackets 28, there is a lifter portion 50 extending into the concavities defined by the rollers 40 on the same spools 34 and 36 and between longitudinally adjacent spools 34 and 36. Other numbers of off-loading elements 48 may be provided per bracket 28 responsive to the number of rollers 40 per bracket 28.

Figure 4:
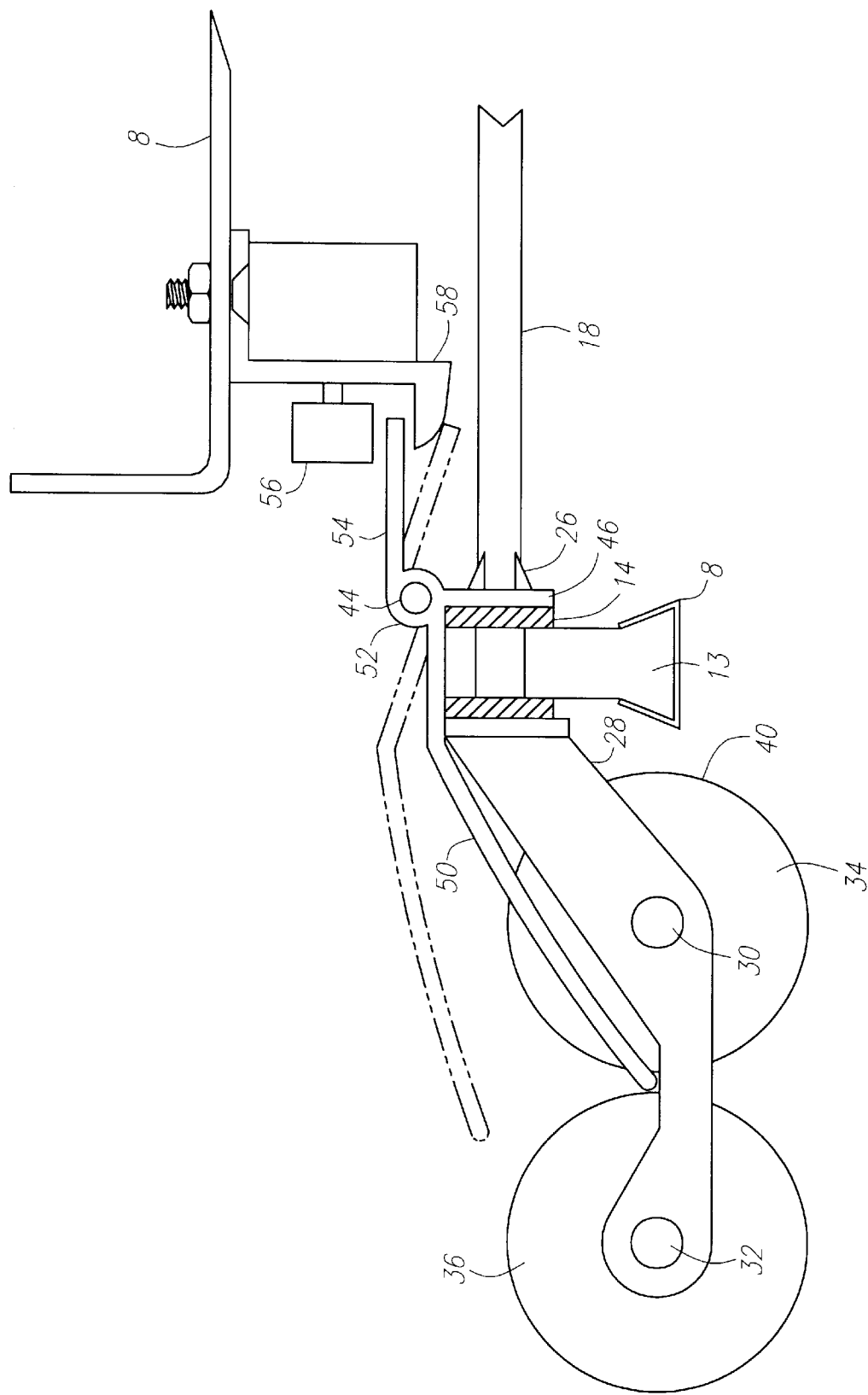
FIG. 4 is a cross-sectional view taken along line 4—4 of FIG. 2.
Figure 5:
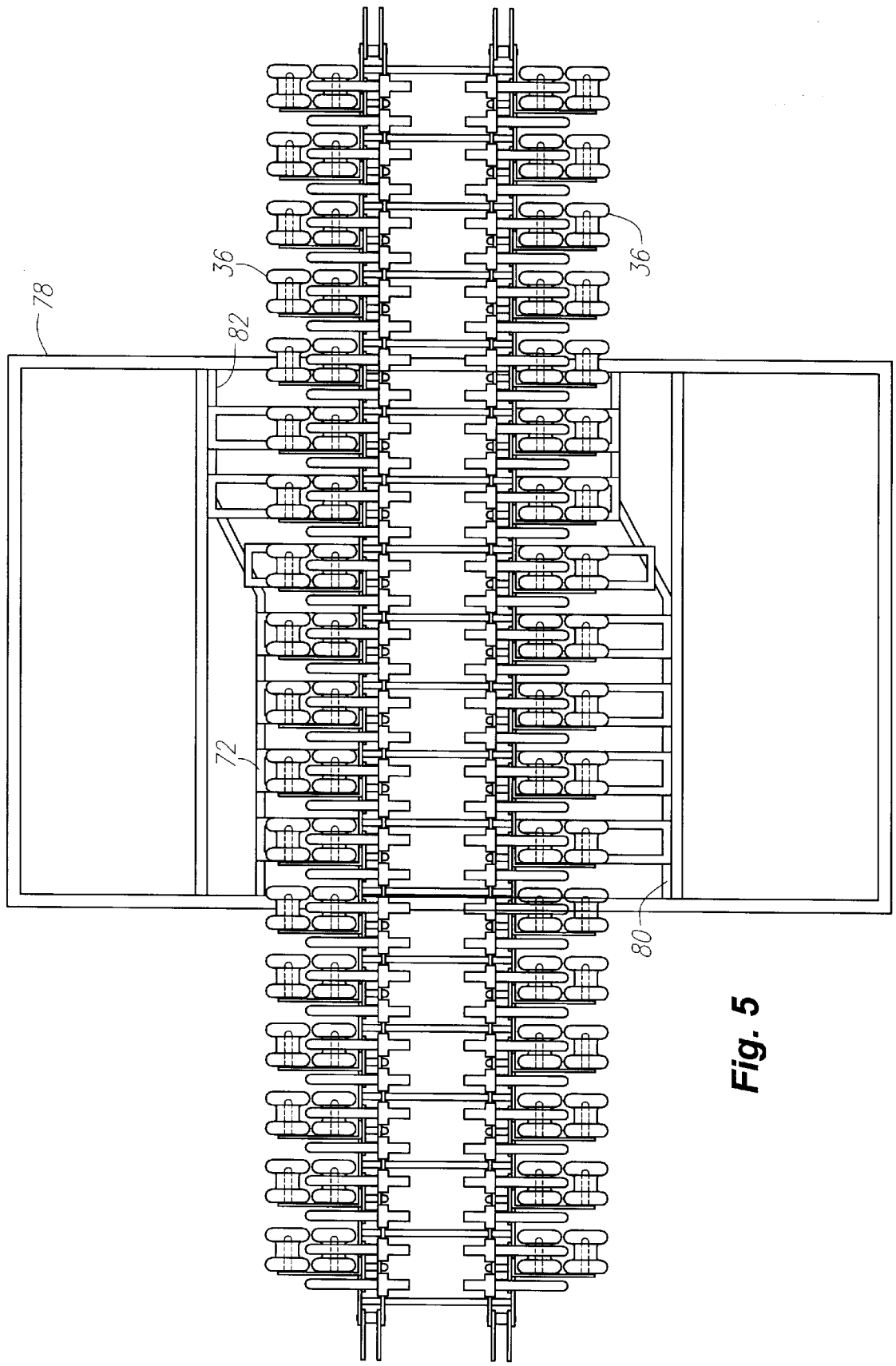
FIG. 5 is a plan view of a portion of the actuator.
Figure 6:
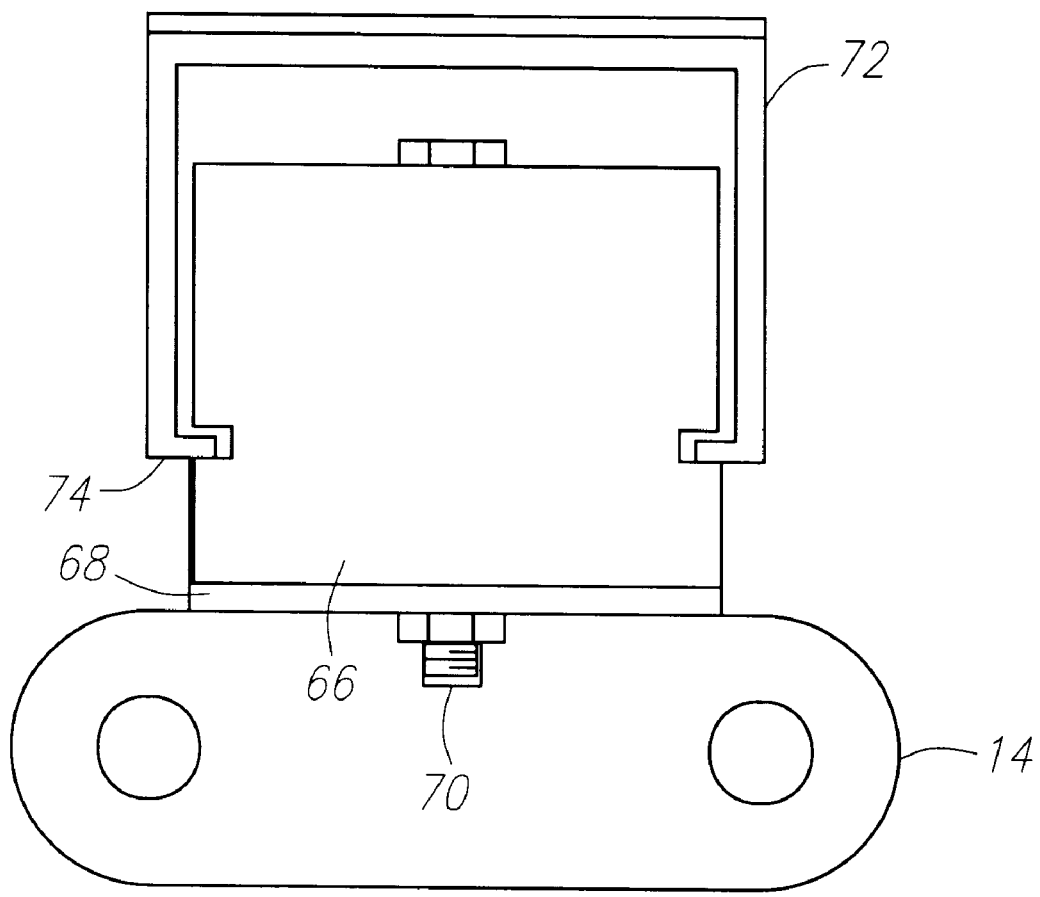
FIG. 6 is a side view of one element of the actuator.
Figure 7:
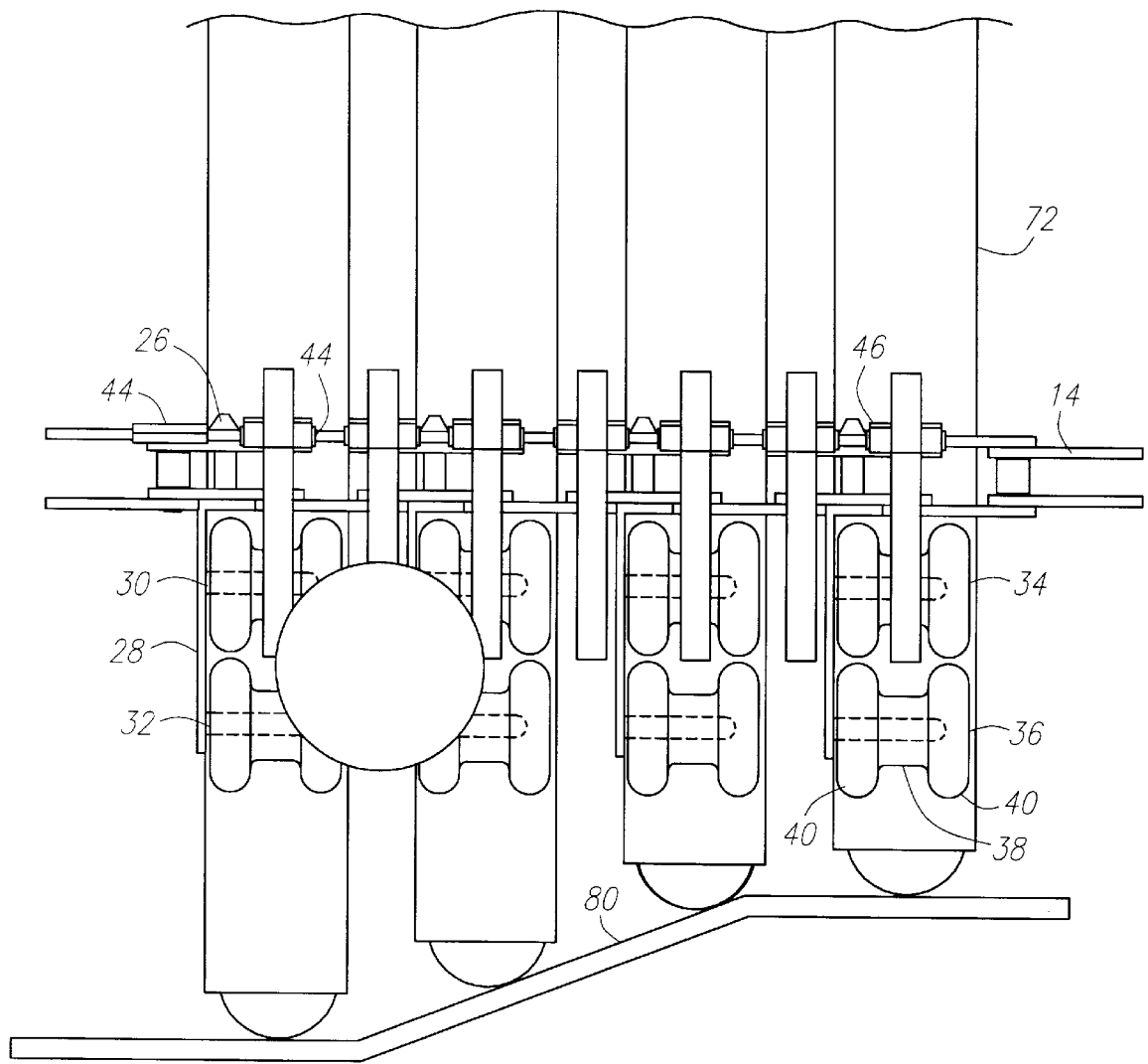
FIG. 7 is a plan view of a portion of the conveying system illustrating an actuator below the conveyor.

Actuating mechanisms operating on a similar principle to those disclosed in U.S. Pat. Nos. 5,029,692, 5,215,179 and 5,474,167 are employed on the actuator portions 54. Solenoids 56 selectively extend into the path of travel of the actuator portions 54 causing the off-loading elements 48 to pivot about the pivot axles 44. The actuator portions 54 are then brought into contact with the lower surface of a cam 58. Through this motion, the lifter portion 50 is raised as shown in phantom in FIG. 4 to off-load a product unit sitting within the adjacent concavity. As the lifter portion 50 moves, it sweeps through the concavity within which it has been positioned. Adjacent off-loading elements 48 may also be actuated in the event that a product is sensed to extend across multiple such concavities. Once past the off-loading station, the actuator portion 54 is released and the off-loading element 48 returns to a rest position.

A laterally articulated actuator is provided on the support structure underlying the conveying path in the area beneath the optics 20. The actuator includes elongate conveying elements in the form of two endless chains 60. The chains 60 are mounted around sprockets 62 and 64 and are guided along a low friction runner 65. Mounting blocks 66 are mounted to each chain link of each of the endless chains 60. Plates 68 are welded, formed or otherwise fixed to each link of the chains 60 and in turn support the mounting blocks 66. Roller chains come standard with and without such plates 68. The mounting blocks 66 may be affixed to the plate 68 by means of fasteners 70. Some float is allowed in these mountings through use of self-locking fasteners 70 which have shanks smaller than the holes in the plates 68. Slats 72 are slidably mounted on the chains 60 by being slidably positioned on the mounting blocks 66. Grooves along either side of each mounting block 66 receive rails 74 on the slats 72. The rails 74 constrain the slats 72 to only move laterally across the chains 60. The slats 72 are conveniently extruded elements.

The lateral articulated actuator is driven by a chain 76 engaged with the idler sprocket 12 and the sprocket 62. The driving arrangement is chosen so that the chains 60 move at the same speed and direction as the chains 14 and 16. Individual slats 72 are also arranged to be positioned below the rollers 40. Further, the slats 72 are positioned against the rollers 40 of each of the spools 34 and 36. As a slat 72 moves laterally, the rollers 40 will also rotate through a predetermined angle dependent upon the lateral displacement of the associated slat 72.

A guide 78 includes a guide surface 80 which extends into the path of travel of the ends of the slats 72. A second guide surface 82 may be arranged to face the first guide surface 80 and remain at a constant displacement laterally from the first guide surface so that the slats 72 will just fit between the guide surfaces 80 and 82 and will be driven by them through reasonably precise lateral displacements. The slats 72 include low friction ends 84 against which the guide surfaces 80 and 82 operate.

Depending upon the diameter of the rollers 40 and the diameter of the product conveyed, the lateral movement of the slats 72 will rotate the product unit through a predetermined segment. By providing the slats 72 with sufficient width, multiple guides 78 may be set up to control the lateral positioning of the slats 72. A first guide could move the product unit through, for example, one-third of a rotation. The second guide would then provide a second one-third rotation so that the entire surface of the product unit has ultimately been exposed to the optics 20.

Variations may also be provided as needed for the guiding surfaces 80 and 82. For example, one of the guide surfaces may be arranged as a flat plate which does not follow the movement of the slats 72 but rather simply provides the full limit of extension for the slats 72 imposed by the corresponding surface at the other end of the slats 72. Thus, if an elongate product is positioned on the conveyor, one slat 72 may drive the product to rotate which in turn causes other slats 72 to move laterally before they reach the guide face which is extending into the path of travel of the slats 72. In this way, the slats 72 have the freedom to move together under a single product unit rather than sequentially. A further guide 78 must also be provided to place the slats 72 again in the initial position in preparation for exacting lateral displacement across the chains 60 at each succeeding guide 78. The guides 78 may also be individually articulated to pivot in and out by means of a stepper motor. Variations in product unit size may be accommodated as sensed by the optics 20.

Figure 8:
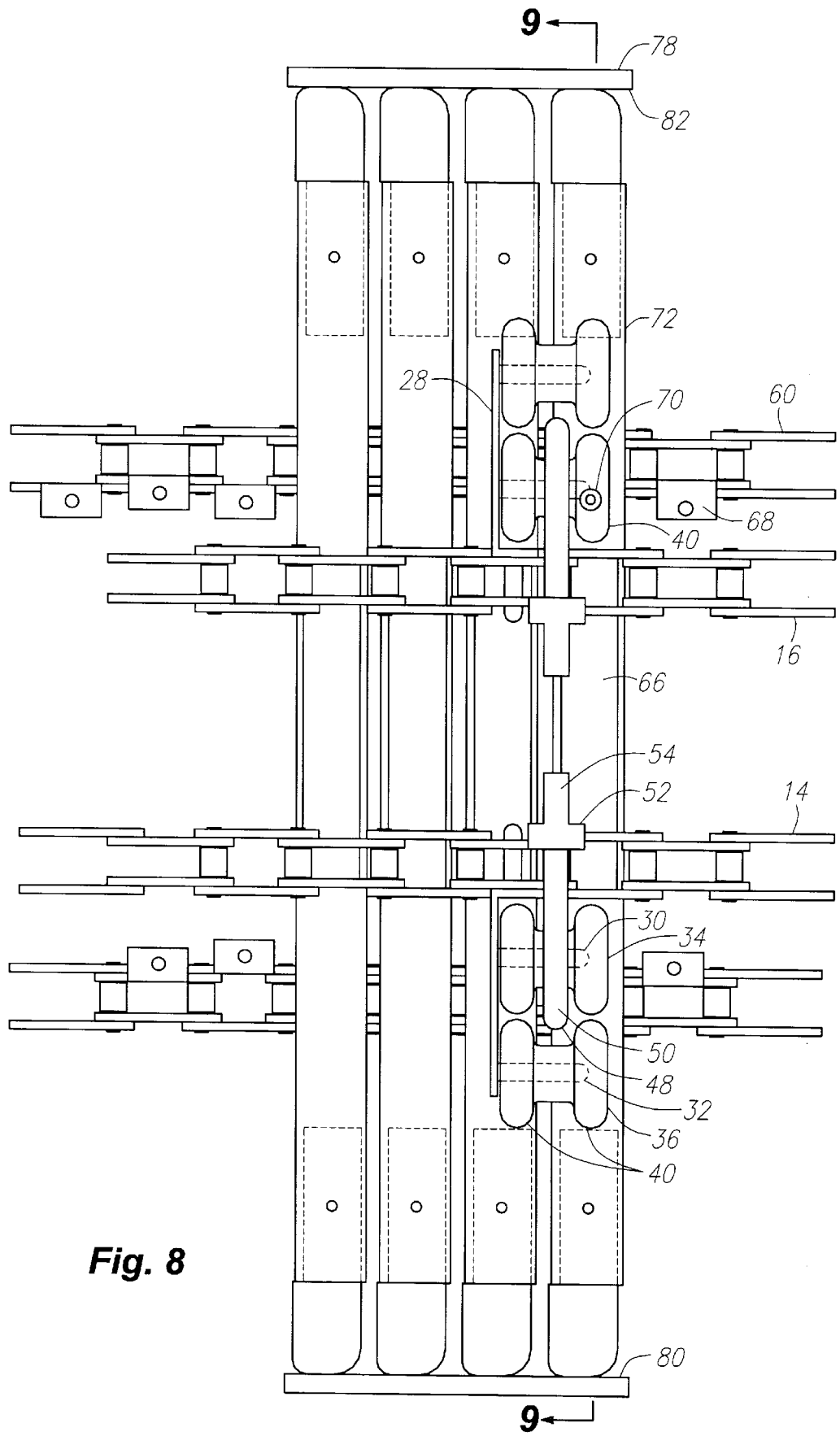
FIG. 8 is a plan view of a portion of a conveying system of a second embodiment illustrating an actuator below the conveyor.
Figure 9:
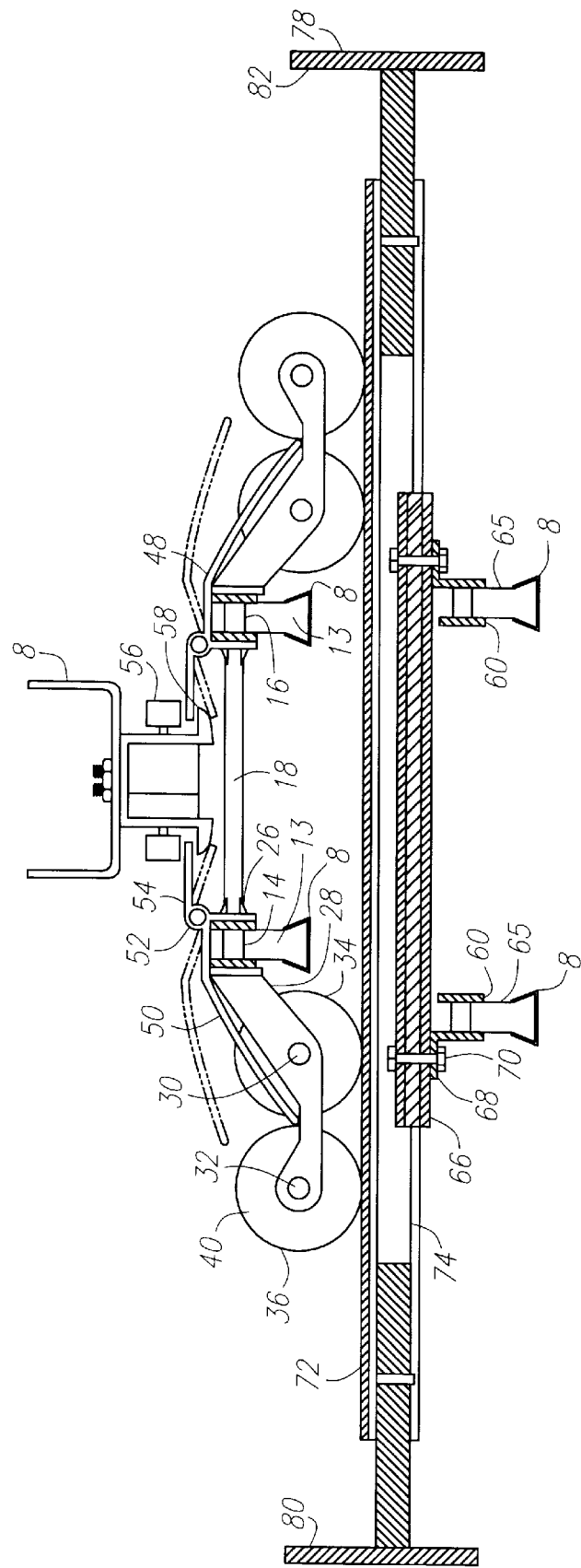
FIG. 9 is a cross-sectional elevation taken along line 9—9 of FIG. 8.

Turning to a second embodiment as illustrated in FIGS. 8 through 10, much of the same system is employed and like reference numerals are applied. A principal distinction is the use of one slat 72 per roller on each of the spools 34 and 36 rather than one slat 72 for each mounting bracket 28 containing two spools 34 and 36. This arrangement is currently considered preferred. Rather than attaching mounting blocks 66 to every other link of the endless chain 60, mounting blocks 66 are attached to each chain link.

FIG. 10 illustrates an area of the conveyor beneath the optics 20. Three views of each product unit is contemplated by this arrangement. The guide 78 is shown to have guide surfaces 80 and 82 which provide for a first scan at position 84, rotation of the product unit at position 86, a second scan at position 88, a second rotation at position 90 and a third scan at position 92. With this arrangement, a rotation in thirds of each product unit is contemplated. The diameter of the product unit determines the degree of slope of each rotation position. Even so, it has been found that a variety of product unit diameters may be handled by the same process without noticeable degradation in results.

In operation, product units are singulated and fed onto the rollers 40 of the elongate conveying elements 14 and 16. A first view is made of the product units on either chain 14 and 16. This view may be or may be similar to a line scan across the product unit. Either one-half, one-third or one-quarter of the product unit width would be viewed at a first station.

Once the first view is complete, the product unit is rotated through a portion of a revolution exposing the next segment of the product to a second station of the optics 20. The rotation is achieved by the movement of the slats beneath the rollers under the influence of a guide 78. Once moved, the product unit stops rotating for a successive viewing. If the product unit is only rotated through a third or a quarter of a rotation, one or more succeeding guides 78 are presented between viewing positions to rotate the product unit further by movement of the slats 72 beneath the rollers 40. Once the physical attributes of the products are sensed by the optics 20, they continue to off-loading stations where they are off-loaded at the appropriate station commensurate with the state of the physical attribute or attributes which are being sensed.

The slats 72 leave the rollers 40 once through the optic station 20 and a low friction runner again supports the endless chains 14 and 16. The slats 72 are returned to their initial position through a further guide 78 which may be located at the lower return extent of the chain 76. The amount of displacement of the guide surface laterally of the conveying path may be changed through replacement of the guides 78. In this way, various rotation schemes can be accommodated as well as variations in the average diameter of the product being processed.

Accordingly, an improved conveying system has been disclosed for product units, particularly produce. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A conveyor of product units, comprising a support structure;

an elongate conveying element movably mounted on the support structure and defining a conveying path;

first rollers rotatably mounted on the elongate conveying element about first axes of rotation extending in the elongate direction of the conveying element, the first rollers being spaced one from another along the elongate conveying element;

second rollers rotatably mounted on the elongate conveying element about second axes of rotation extending in the elongate direction of the conveying element, the second rollers being spaced one from another along the elongate conveying path;

a laterally articulated actuator including a second elongate conveying element movably mounted on the support structure below at least one of the first and the second rollers and driven to move with the elongate conveying element along a portion of the conveying path, slats slidably mounted on the second conveying element to move laterally of the conveying path and be in friction engagement with at least one of the first and the second rollers along the portion of the conveying path where the second conveying element is to move with the elongate conveying element, a guide on the support structure along the portion of the conveying path where the second conveying element is to move with the elongate conveying element and having a guide surface extending into the path of travel of the slats to move the slats laterally on the second conveying element.

2. The conveyor of claim 1, the second conveying element including an endless chain having succeeding portions extending below the at least one of the first and the second rollers as the endless chain moves on the support structure.

3. The conveyor of claim 1, the slats being in friction engagement with both the first and the second rollers.

4. The conveyor of claim 1 further comprising
mounting brackets fixed to the conveying element and extending latterly therefrom;
first spools of two first rollers each;
second spools of two second rollers each, each mounting bracket having a first spool and a second spool rotatably mounted thereto, the first spool and the second spool on each mounting bracket being laterally adjacent.

5. The conveyor of claim 4, the slats being in friction engagement with both the first and the second spools.

6. The conveyor of claim 5, each slat being in friction engagement with one first spool and one second spool rotatably mounted to one mounting bracket, respectively.

7. The conveyor of claim 5, each slat being in friction engagement with both one first roller and one second roller rotatably mounted to one mounting bracket, respectively.

8. The conveyor of claim 1, the laterally articulated actuator further including mounting blocks fixed to the second elongate conveying element, the slats being slidably engaged with the blocks and extending laterally from the blocks to either side of the second elongate conveying element, respectively.

9. The conveyor of claim 1, the guide including a second guide surface opposed to the guide surface and of constant displacement laterally of the second elongate conveying element from the guide surface to receive the slats therebetween.

10. The conveyor of claim 1, the laterally articulated actuator including multiple guides with guide surfaces extending into the path of travel of the slats.

11. The conveyor of claim 1, the first rollers being adjacent and parallel to the second rollers, respectively, to define a continuous elongate concavity between the first and the second rollers fully along the conveying path.

12. The conveyor of claim 11, the first rollers defining first concavities between adjacent first rollers and the second rollers defining second concavities between adjacent second rollers, the first and the second concavities extending laterally of the conveying path from the elongate concavity.

13. The conveyor of claim 12 further comprising off-loading elements pivotally mounted on the conveying element and extending to the elongate cavity, the off-loading elements having paths of pivotal travel through the concavities, respectively, to off-load product units laterally of the conveying path.

14. A laterally articulated actuator comprising
a support structure;
a conveying element movably mounted on the support structure;
slats slidably mounted on the conveying element to move laterally relative to the conveying element;
a guide on the support structure having a first guide surface extending into the path of travel of the slats to move the slats laterally relative to the conveying element;
mounting blocks fixed to the elongate conveying element, the slats being slidably engaged with the blocks and extending laterally relative to the elongate conveying element from the blocks to either side of the elongate conveying element, respectively.

15. The laterally articulated actuator of claim 14, the conveying element including an endless chain.

16. The laterally articulated actuator of claim 14, the guide including a second guide surface opposed to the guide surface and of constant displacement laterally of the elongate conveying element from the guide surface to receive the slats therebetween.

17. The laterally articulated actuator of claim 14, the laterally articulated actuator including multiple guides with guide surfaces extending into the path of travel of the slats.

18. A conveyor of product units, comprising
a support structure;
an elongate conveying element movably mounted on the support structure and defining a conveying path;
first rollers rotatably mounted on the elongate conveying element about first axes of rotation extending in the elongate direction of the conveying element, the first rollers being spaced one from another along the elongate conveying element, defining first concavities between adjacent first rollers;
second rollers rotatably mounted on the elongate conveying element about second axes of rotation extending in the elongate direction of the conveying element, the second rollers being spaced one from another along the elongate conveying path, defining second concavities between adjacent second rollers, the first rollers being adjacent and parallel to the second rollers, respectively, to define a continuous elongate concavity between the first and the second rollers fully along the conveying path, the first and the second concavities extending laterally of the conveying path from the elongate concavity;
off-loading elements pivotally mounted on the conveying element and extending to the elongate concavity at the concavities between adjacent rollers, respectively, the off-loading elements having paths of pivotal travel through the concavities, respectively, to off-load product units laterally of the conveying path;
a laterally articulated actuator including a second elongate conveying element movably mounted on the support structure below at least one of the first and the second rollers and driven to move with the elongate conveying element along a portion of the conveying path, slats slidably mounted on the second conveying element to move laterally of the conveying path and be in friction engagement with at least one of the first and the second rollers along the portion of the conveying path where the second conveying element is to move with the elongate conveying element, a guide on the support structure along the portion of the conveying path where the second conveying element is to move with the elongate conveying element and having a guide surface extending into the path of travel of the slats to move the slats laterally on the second conveying element.

19. A conveyor of product units, comprising
a support structure;
an elongate conveying element movably mounted on the support structure and defining a conveying path;
first rollers rotatably mounted on the elongate conveying element about first axes of rotation extending in the elongate direction of the conveying element, the first rollers being spaced one from another along the conveying path;

second rollers rotatably mounted on the elongate conveying element about second axes of rotation extending in the elongate direction of the conveying element, the second rollers being spaced one from another along the conveying path, the first rollers being adjacent laterally relative to the conveying path to the second rollers, respectively, and the first axes being parallel to the second axes, respectively, to define a continuous elongate concavity between the first and the second rollers fully along the conveying path, the first rollers defining first concavities between adjacent first rollers, the second rollers defining second concavities between adjacent second rollers, the first and the second concavities extending laterally of the conveying path from the elongate concavity;

off-loading elements pivotally mounted on the conveying element to pivot relative to the first and second axes and extending at least to between adjacent first rollers, respectively, the off-loading elements having paths of pivotal travel through at least the first concavities, respectively.

20. The conveyor of claim 19, the off-loading elements being mounted about axes parallel to the elongate direction of the conveying element and having paths of pivotal travel through the first and second concavities transversely of the elongate concavity.

21. The conveyor of claim 18 further comprising mounting brackets fixed to the conveying element;

first spools of two first rollers each;

second spools of two second rollers each, the first and the second spools being mounted to the mounting brackets, each mounting bracket having a first spool and a second spool rotatably mounted thereto, the first spool and the second spool on each mounting bracket being adjacent laterally relative to the conveying path.

22. A conveyor of product units, comprising a support structure;

an elongate conveying element movably mounted on the support structure and defining a conveying path;

first rollers rotatably mounted on the elongate conveying element about first axes of rotation extending in the elongate direction of the conveying element, the first rollers being spaced one from another along the conveying path;

second rollers rotatably mounted on the elongate conveying element about second axes of rotation extending in the elongate direction of the conveying element, the second rollers being spaced one from another along the conveying path; off-loading elements pivotally mounted on the conveying element to pivot relative to the first and second axes and extending at least to between adjacent first rollers, respectively;

mounting brackets fixed to the conveying element;

first spools of two first rollers each;

second spools of two second rollers each, the first and the second spools being mounted to the mounting brackets, each mounting bracket having a first spool and a second spool rotatably mounted thereto, the first spool and the second spool on each mounting bracket being adjacent laterally relative to the conveying path, the off-loading elements extending to between all first rollers on the same first spool and to between all first rollers on adjacent first spools, respectively.

23. An off-loading conveyor of product units, comprising a support structure;

an elongate conveying element movably mounted on the support structure and defining a conveying path;

a plurality of first rollers rotatably mounted on the elongate conveying element about first axes of rotation extending in the elongate direction of the conveying element, the first rollers being spaced one from another along the conveying path;

a plurality of second rollers rotatably mounted on the elongate conveying element about second axes of rotation extending in the elongate direction of the conveying element, the second rollers being spaced one from another along the conveying path;

an actuator in friction contact with at least one of the plurality of first rollers and the plurality of second rollers along a first portion of the conveying path, the actuator being movable to rotate at least the first rollers along the first portion of the conveying path.

24. The conveyor of claim 23, the actuator including a second elongate conveying element movably mounted on the support structure below the elongate conveying element along the first portion of the conveying path and driven to move with the elongate conveying element along the first portion of the conveying path, slats slidably mounted on the second conveying element to move laterally relative to the conveying path and be in friction engagement with at least one of the first and the second rollers along the portion of the conveying path where the second conveying element is to move with the elongate conveying element, a guide on the support structure along the portion of the conveying path where the second conveying element is to move with the elongate conveying element and having a guide surface extending into the path of travel of the slats to move the slats laterally relative to the conveying path on the second conveying element.

25. The conveyor of claim 24, the second conveying element including an endless chain having succeeding portions extending below the first elongate conveying element as the endless chain moves on the support structure.

26. The conveyor of claim 23, the actuator being in friction engagement with both the plurality of first rollers and the plurality of second rollers along the first portion of the conveying path to rotate the first rollers and the second rollers along the first portion of the conveying path simultaneously and in the same direction.

27. The conveyor of claim 23, the first rollers being adjacent and parallel to the second rollers, respectively, to define a continuous elongate concavity between the first and the second rollers fully along the conveying path.

28. The conveyor of claim 27, the first rollers defining first concavities between adjacent first rollers and the second rollers defining second concavities between adjacent second rollers, the first and the second concavities extending laterally of the conveying path from the elongate concavity.

29. The conveyor of claim 28 further comprising off-loading elements pivotally mounted on the conveying element to pivot relative to the first and second axes and extending at least to between all adjacent first rollers, respectively.

30. A conveyor of product units, comprising a support structure;

an elongate conveying element movably mounted on the support structure and defining a conveying path;

first rollers rotatably mounted on the elongate conveying element about first axes of rotation extending in the elongate direction of the conveying element, the first rollers being spaced one from another along the conveying path;

second rollers rotatably mounted on the elongate conveying element about second axes of rotation extending in the elongate direction of the conveying element, the second rollers being spaced one from another along the conveying path;

off-loading elements pivotally mounted on the conveying element to pivot relative to the first and second axes and extending at least to between adjacent first rollers, respectively;

a lateral actuator in contact with the first rollers and the second rollers along a first portion of the conveying path, the lateral actuator being movable to rotate the first rollers and the second rollers simultaneously and in the same direction along the first portion of the conveying path, the lateral actuator being in friction contact with the first rollers and the second rollers along the first portion of the conveying path.

* * * * *

UNITED STATES PATENT AND TRADEMARK OFFICE
CERTIFICATE OF CORRECTION

PATENT NO.  : 5,988,351
DATED       : November 23, 1999
INVENTOR(S) : A. JAMES WARKENTIN It is certified that error appears in the above-identified patent and that said Letters Patent is hereby corrected as shown below:

In claim 21 (Col. 9, line 27), delete "18" and insert therefor -- 19 --.

Signed and Sealed this

Fifth Day of September, 2000

Attest:

Q. TODD DICKINSON

*Attesting Officer*

*Director of Patents and Trademarks*